March 19, 1963  A. E. SCERBO  3,081,907
MATERIAL DISPENSER
Filed March 20, 1961  6 Sheets-Sheet 1
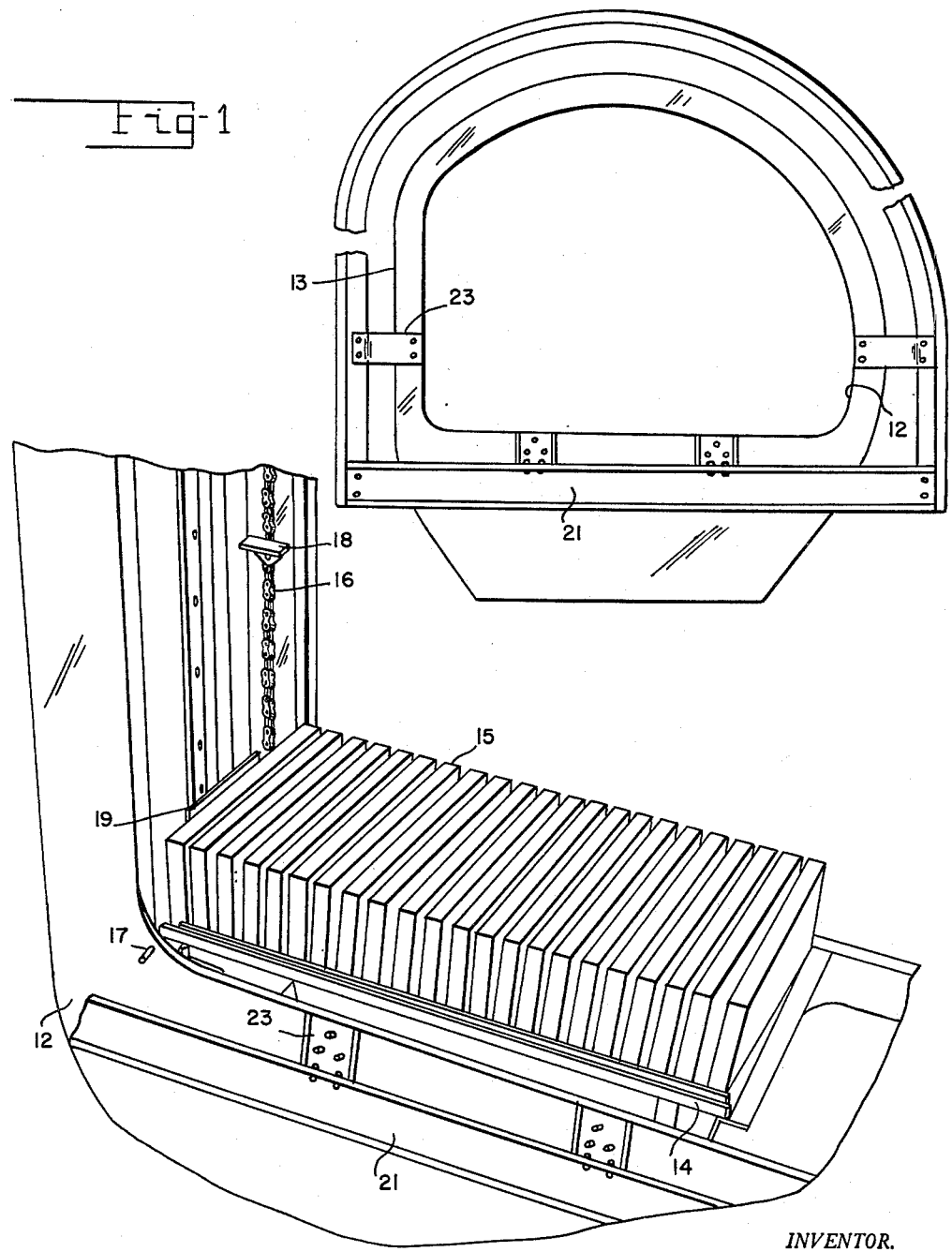
*INVENTOR.*
ALFONSO E. SCERBO
BY
ATTORNEYS

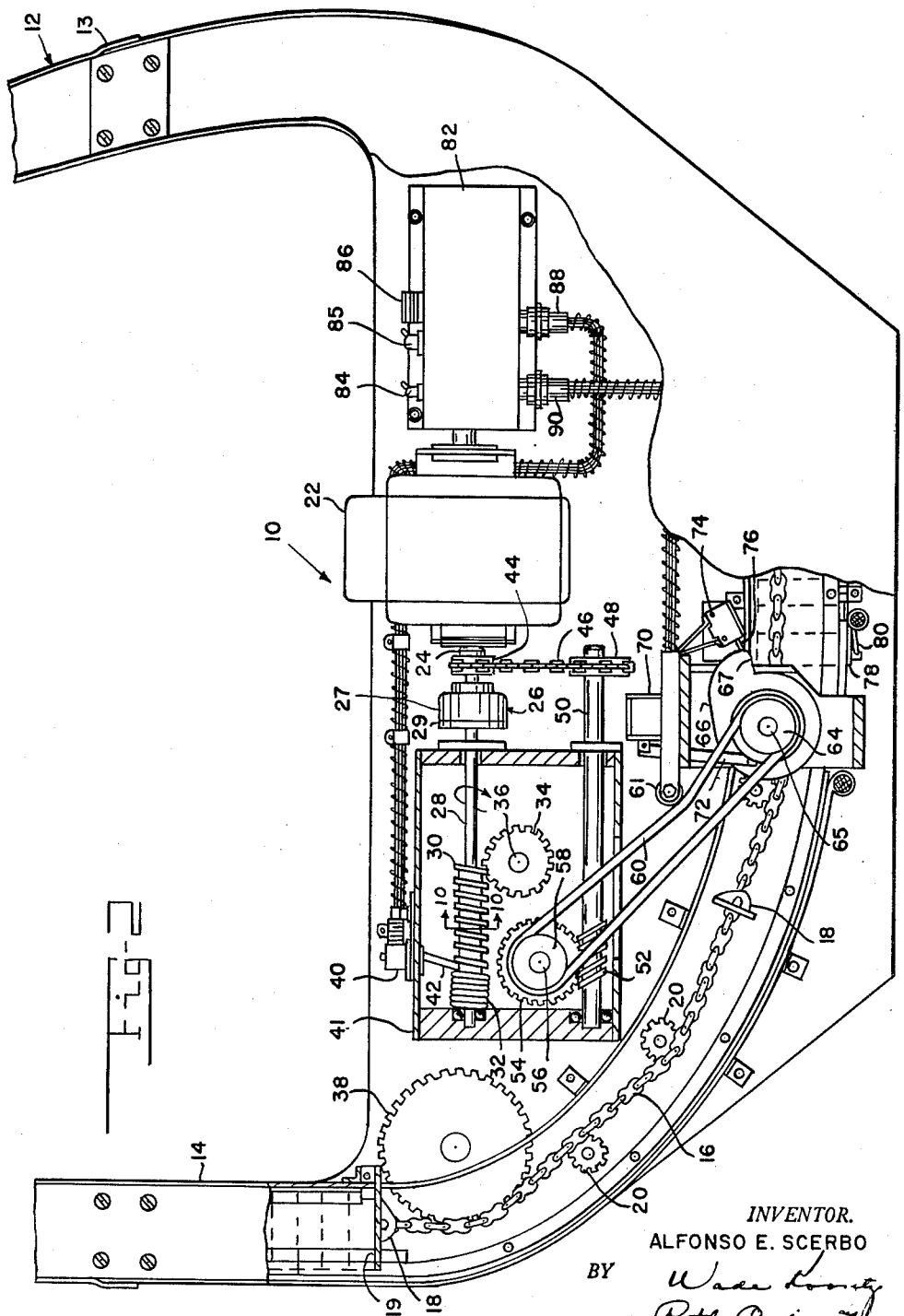

March 19, 1963  A. E. SCERBO  3,081,907
MATERIAL DISPENSER
Filed March 20, 1961  6 Sheets-Sheet 3
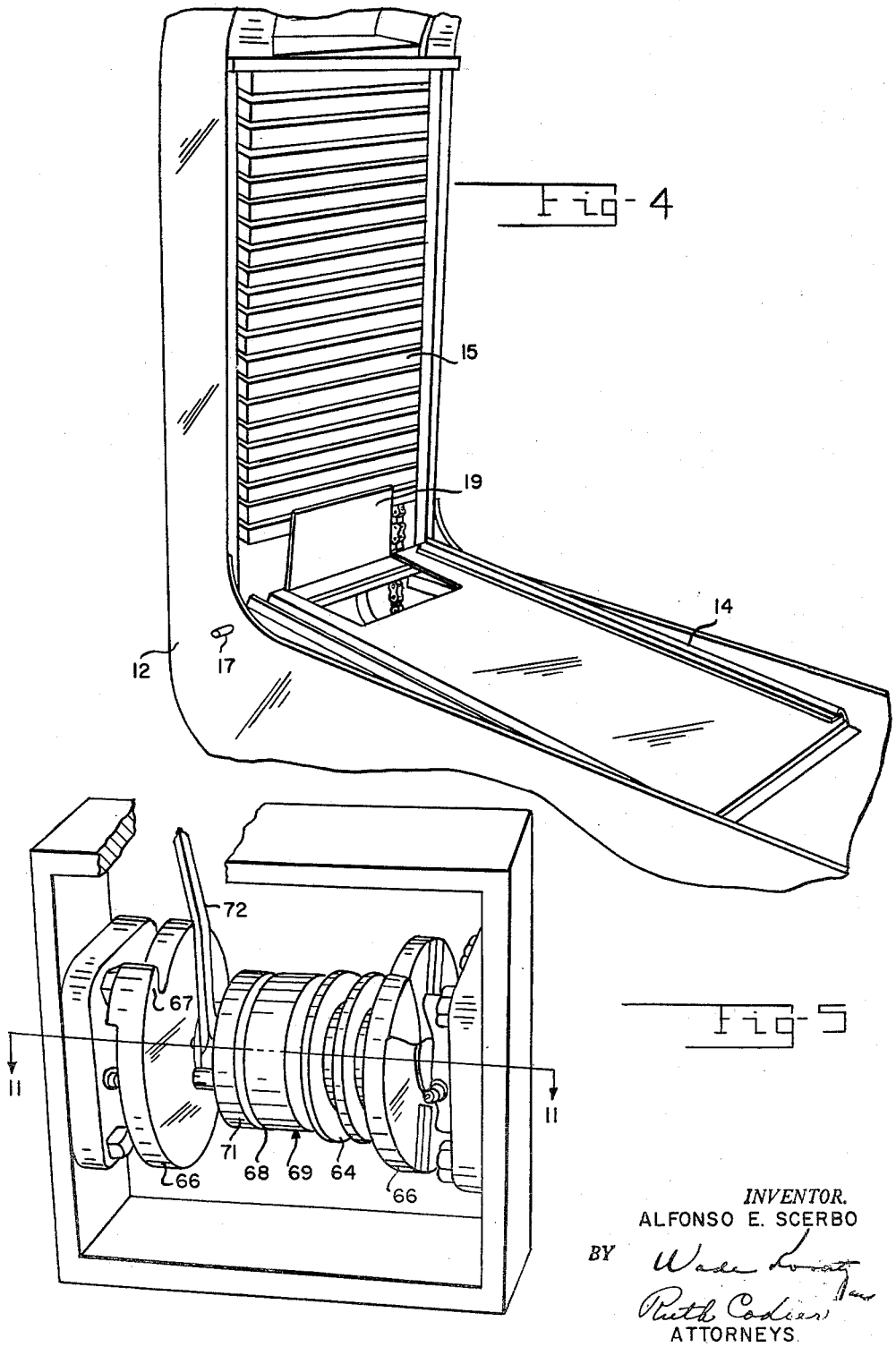
INVENTOR.
ALFONSO E. SCERBO
BY
ATTORNEYS March 19, 1963  A. E. SCERBO  3,081,907
MATERIAL DISPENSER
Filed March 20, 1961  6 Sheets-Sheet 4
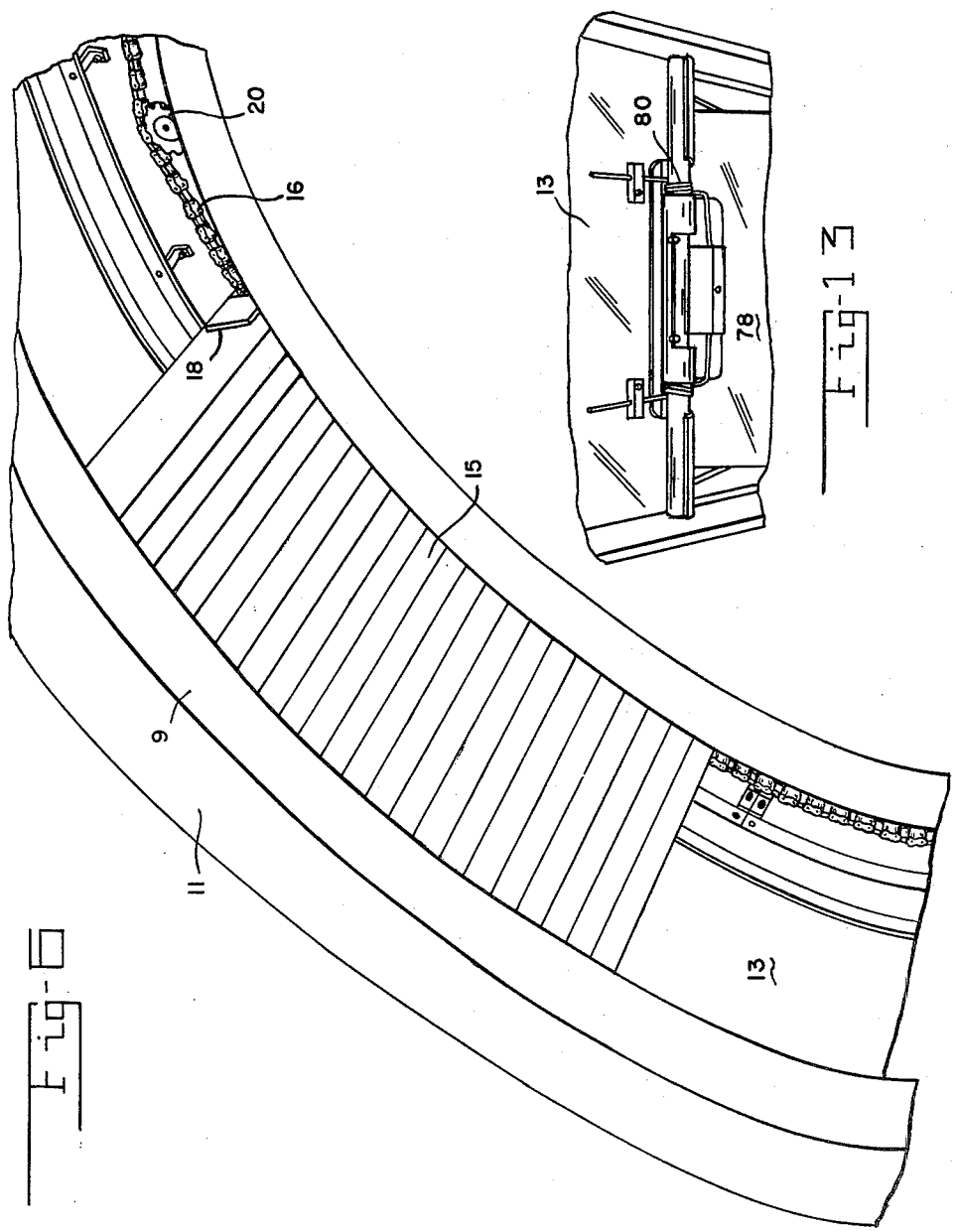
INVENTOR.
ALFONSO E. SCERBO
BY
ATTORNEYS March 19, 1963
A. E. SCERBO
3,081,907
MATERIAL DISPENSER
Filed March 20, 1961
6 Sheets-Sheet 5
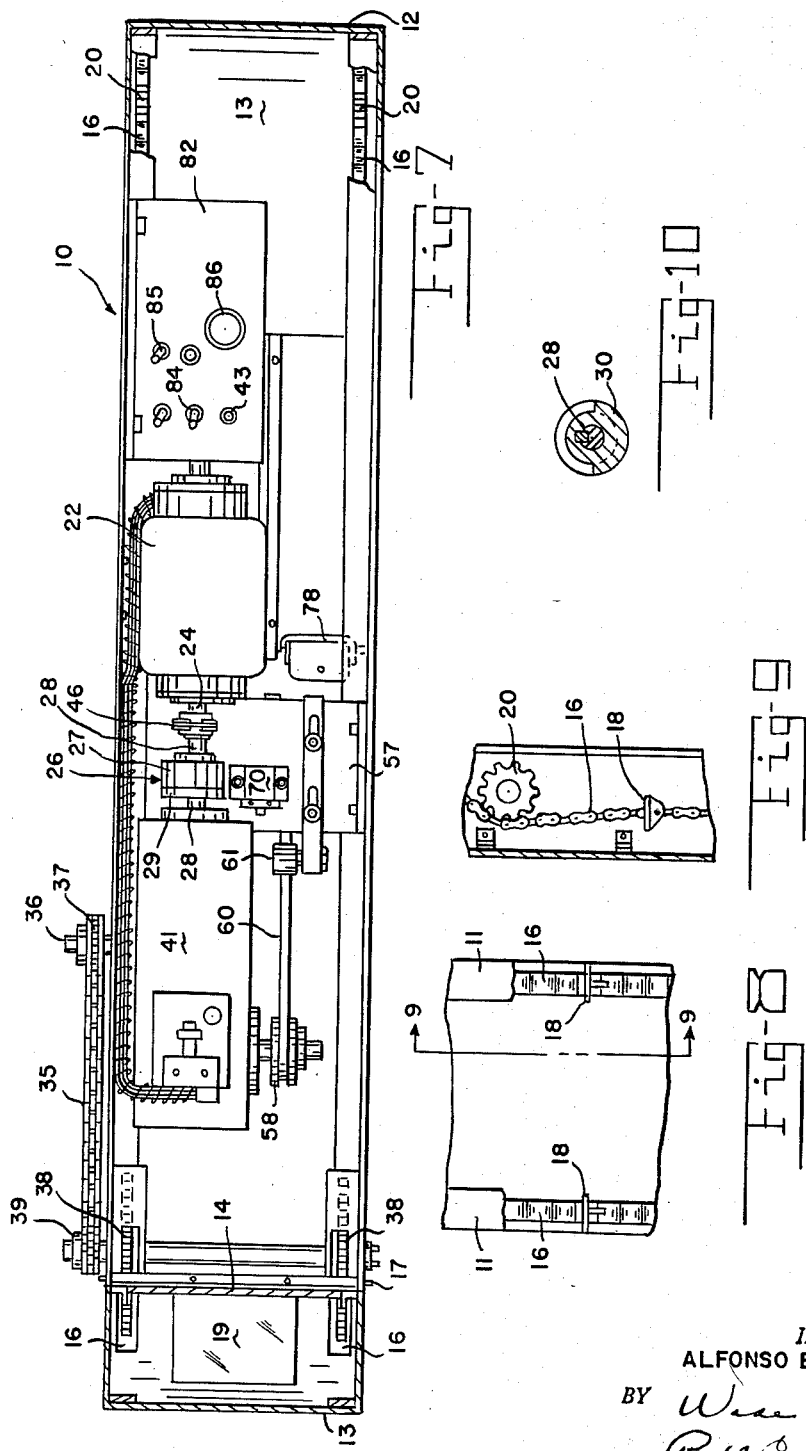
INVENTOR.
ALFONSO E. SCERBO
BY
ATTORNEYS March 19, 1963    A. E. SCERBO    3,081,907
MATERIAL DISPENSER Filed March 20, 1961    6 Sheets-Sheet 6

INVENTOR.
ALFONSO E. SCERBO
BY
ATTORNEYS

United States Patent Office 3,081,907
Patented Mar. 19, 1963

3,081,907
MATERIAL DISPENSER
Alfonso E. Scerbo, Jersey City, N.J., assignor to the United States of America as represented by the Secretary of the Air Force
Filed Mar. 20, 1961, Ser. No. 97,117
2 Claims. (Cl. 221—15)

This is a continuation-in-part of application Serial No. 665,874, filed June 14, 1957, for Material Dispenser, now abandoned.

This invention relates to material dispensers and, more particularly, to material dispensers designed for use in a moving vehicle.

As the complexity of modern vehicles and especially military vehicles such as aircraft, submarines, etc., has increased, the available unoccupied space in them has steadily diminished. Since these vehicles must, on occasion, perform material dispensing missions, the problem of finding suitable space for storing the material and the dispensing mechanism in the vehicle has caused increasing difficulty. Part of this difficulty was caused by the fact that prior dispensing mechanisms were not specially designed to conform to the shape of the vehicle in which it was to be mounted. Consequently, the available space in the vehicle could not be efficiently utilized. Furthermore, since vehicles, particularly aircraft and military vehicles, are subject to rapid changes in speed, direction and orientation, prior dispensing mechanisms which were not specifically designed with these conditions in mind, did not function effectively.

It is, therefore, the principal object of this invention to provide a material dispensing mechanism which is designed to conform to the shape of the vehicle in which it is to be mounted.

A further object of this invention is to provide a material dispensing mechanism for a moving vehicle which can function under widely varying and sudden changes in the speed, direction and orientation of the vehicle.

Yet another object of this invention is to provide a material dispenser which is easy to make, economical and compact.

These and other objects of this invention will be better understood when read in the light of the accompanying description and drawings wherein:

FIG. 1 is a side elevation of the container portion of the material dispenser, with a fragmentary showing of the framework of the aircraft to which it is secured.

FIG. 2 is a side elevation partly in section with the outer casing partly broken away of the dispensing mechanism disclosing the arrangement of the various mechanical parts of the device.

FIG. 3 is a perspective view of the platform loading door filled with material about to be loaded into the container.

FIG. 4 is a perspective view of the dispensing mechanism just after the material on the platform loading door has been inserted in the container.

FIG. 5 is a perspective view of the material ejecting mechanism.

FIG. 6 is a perspective view of a portion of the dispenser container showing how the material in the container is held in place regardless of the orientation of the vehicle.

FIG. 7 is a top plan view of the lower section of the container with portions in cross section showing the controlling and operating mechanism.

FIG. 8 is a fragmentary view of the interior base surface of the container, showing the pair of chains and one pair of push members attached thereto.

FIG. 9 is a section taken on the line 9—9 of FIG. 8.

FIG. 10 is a cross sectional view of shaft and sleeve, taken on the line 10—10 of FIG. 2.

FIG. 13 is a fragmentary view of the spring biased door through which the articles are ejected.

Figure 11:
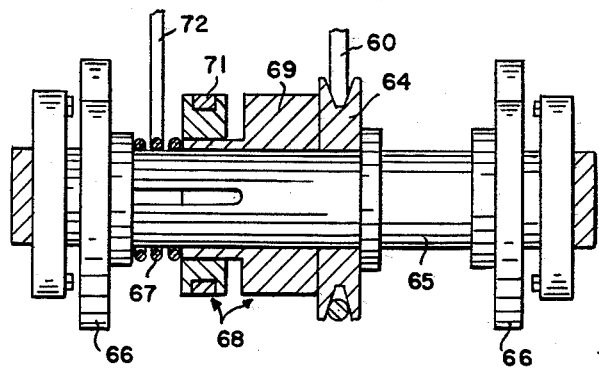
FIG. 11 is a cross sectional view taken on the line 11—11 of FIG. 5.
Figure 12:
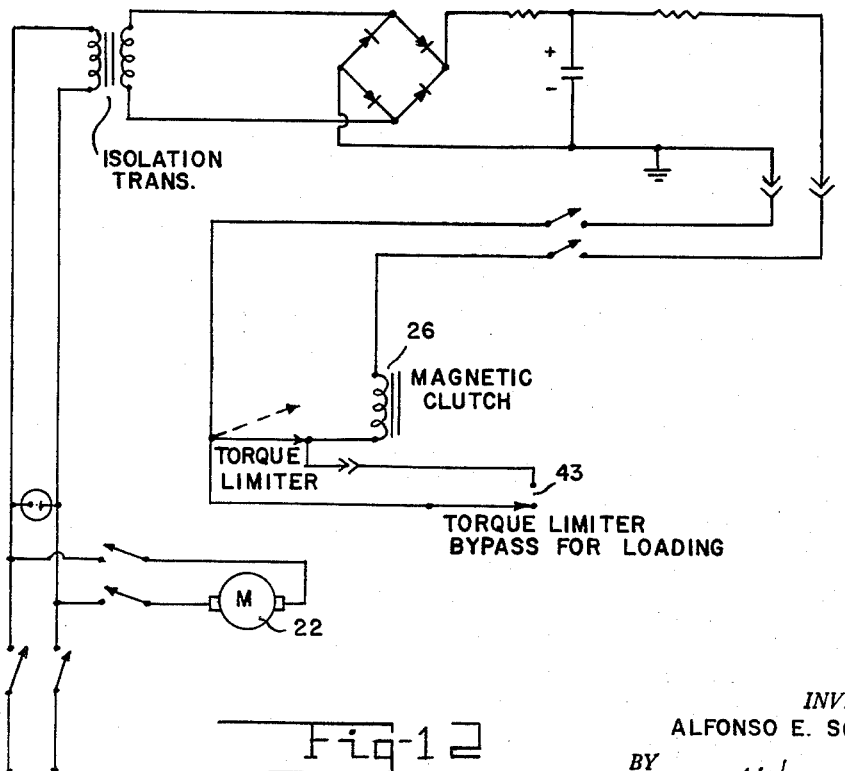
FIG. 12 is a wiring diagram.

Referring now to FIGS. 1 and 2, a dispensing apparatus indicated generally at 10 comprises a continuous hollow loop shaped, tube like container 12 adapted to be mounted in a vehicle. The container 12 is channel shaped in cross section and conforms to the inner surface of the vehicle in which the container is to be mounted. It is comprised of a base 13, side channel elements with flanges 11 lying parallel to the base 13 and supports the chaff boxes when they are travelling in the upper area of the loop. The flanges 11 terminate, see FIG. 4, leaving an area adjacent the loading door free for loading the boxes into the container. The dispenser is secured to the aircraft by any suitable and adequate framework, for example, the frame 21 and bracketing 23. As seen more particularly in FIG. 1, a container is provided with a space in its central portion suitable for the passage of people or the storage of apparatus. Special endless chains 16, one mounted in each side of the container 12, extend along the length of the container and inside of it. These chains are driven along by means of driving sprockets 38 and are held in their orbits by means of idler wheels 20 positioned along the length of the container. A plurality of pairs of push members 18, placed opposite each other, are secured to the chains 16 in equal spaced relationship.

A loading platform door 14 is pivotally connected to the container at 17. The container may be mounted to be loaded from the interior of the vehicle, or from the outside thereof. This platform loading door acts to support and index the material being loaded in the dispenser. This is possible because the length of door 14 is equal to the longitudinal distance between adjacent push members 18 on the endless chains 16. A support flange 19 is attached to the door 14 and extends substantially normally therefrom and functions to support the box load until their weight is transferred to the push members 18.

To load the dispenser, a pair of push members 18 are moved along the container until they are in line with the support flange or stop plate 19 when the door is in a vertical or closed position. This is done by a unique loading feature which controls operation of the transport chain mechanism. A momentary contact switch 43 is manually held closed until a pusher bar 18 on the transport chain 16 is brought into line with a stop plate 19 in the loading door. The transport chain is then stopped by releasing the switch 43. Then the door is pivoted into a horizontal position and is loaded with boxes of material 15 to be dispensed, see FIG. 3. After this, the door, loaded with boxes of the material 15 to be dispensed, see FIG. 3. After this, the door, loaded with boxes of the material, is pivoted back into the vertical position, see FIG. 4. This causes the material removed from the door to be supported by push members 18. It is noted that if the door is fully loaded, a pair of push members 18 will engage and support both ends of the stack of boxes. Once the material is in the dispenser container, the chains are again actuated by the momentary contact switch 43, and the push members move the boxes around the dispenser providing space for additional material to be loaded.

A single motor 22 is used to independently drive the driving chains 16 and the dispenser ejecting mechanism. This is possible by means of the following construction. As seen in FIG. 2, a motor 22 rotates a shaft 24 which is connected to one element 27 of an electromagnetic clutch 26. The other element 29 of this clutch is connected to a shaft 28. A gear 34 meshes with teeth 30 on the shaft 28. A pair of sprockets 37 and 39 placed externally of the casing 10 transmit the motion of the sprocket 34 to the sprocket 38, which drives the chain 16.

To provide for an overload in case of jamming and to protect the boxes from being crushed, a torque limiting device including a gear sleeve 30 is reciprocably mounted on shaft 28 by conventional means such as a key and slot arrangement shown in FIG. 10. The sleeve is spring biased by means of spring 32 into engagement with gear 34. Gear 34 rotates shaft 36 which is connected by conventional means such as the chain 35 shown in FIG. 7 to the driving sprocket 38. When an overload occurs, the chain 16 is brought to a stop. It is understood that the term overload indicates a force sufficient to overcome and stop the sprocket 38 and the sprocket 34 which drives it. Since the shaft 28 is still in motion, the splined gear sleeve 30, rotating with it in the direction of the arrow shown in FIG. 2, and in engagement with the gear 34 on the shaft 36, is driven to the left along the shaft 28 as shown in FIG. 2. This movement of the sleeve 30 compresses the spring 32, placing it under tension, and moves the finger 42, thus operating an overload switch in the gear box 40 to de-energize the magnetic clutch 26. The shaft 28 is thus brought to a halt. The power to the electromagnetic clutch 26 passes through the overload switch 40 which is mounted on the top of gear box 41. With this arrangement, when the load on chain 16 exceeds a predetermined limit, the gear sleeve 30 is driven back on shaft 28 against the bias spring 32 engaging and actuating the finger 42. This movement opens overload switch 40 and cuts off the power to the electromagnetic clutch 26 thereby disconnecting shaft 28 and gear sleeve 30 from motor 22 and stopping the chain. Upon release of the overload, the drive automatically resumes normal action. That is to say, with the release of the overload, the bias of the spring 32 moves the finger 42 to close the overload switch 40. The magnetic clutch 29 is again energized and the rotation of the shaft 28 is resumed, operating the sprocket wheel 34 to move the chain 16.

An additional sprocket 44 is also mounted on motor shaft 24. A chain 46 engages this sprocket and passes around sprocket 48. This sprocket 48 is rigidly connected to a shaft 50 also journaled in gear box 41 so rotation of the motor shaft 24 also causes shaft 50 to rotate. It is noted, however, that sprocket 44 is connected to motor shaft 24 before the electromagnetic clutch 26, so even if the electromagnetic clutch 26 becomes disengaged, shaft 50 will continue to rotate. A worm gear 52 is rigidly secured to shaft 50 and this worm gear engages gear 54 causing shaft 56 to rotate. A pulley 58 is rigidly mounted on shaft 56. As seen, a pulley belt 60 is used to transmit power from pulley 58 to pulley 64 which is fixedly attached to the shaft 65. The tension on the pulley belt 60 is provided by means of a horizontally adjustable roller wheel 61.

The actual mechanism of the ejecting apparatus is mounted in an adjustable frame, and is as follows: pulley 64 is connected to one portion 69 of a clutch 68 which is freely rotatable on a shaft 65, see FIGS. 2 and 5. The other portion 71 of clutch 68 is slidably splined on shaft 65 by any conventional means, see FIG. 11. In addition, a pair of ejector plates 66 are also rigidly mounted on shaft 65. Clutch members 69 and 71 are normally held in engagement by conventional means such as the biasing spring 67, so that the movement of belt 60 and pulley 64, rotates shaft 65 along with ejector plates 66. Clutch 68 is controlled by electromagnetic solenoid 70 operating through lever 72. This operating lever 72 operates to disengage the clutch members 69 and 71 by moving the slidably splined member 71 against the bias of the spring 67. The electromagnetic solenoid 70 is connected to the lever 72 by means not shown and, controls its movement. The solenoid can be controlled by an intervalometer shown schematically at 86 in FIG. 2. This makes possible the actuation and deactuation of solenoid 70 and hence clutch 68 at predetermined intervals for predetermined durations. Thus, the ejector plates and the ejector mechanism can be independently controlled. As seen in FIG. 2, each ejector plate 66 has a finger-like projection 67 which is adapted to engage an individual box 15 of material such as chaff and force it through a door 78 spring biased into a closed position by springs 80. This arrangement permits the boxes of chaff to be ejected with sufficient force to overcome the possibility of the boxes being held in the container by air or water stream effects or by the orientation of the vehicle.

An indicator switch 74 is mounted adjacent one of the ejector plates 66 and has a projecting finger 76 which is actuated by the finger-like projection 67 on the ejector plates, once for every revolution of these plates, providing a means for counting the actual boxes of material being dispensed. The control unit for the dispenser is mounted in a box 82. It includes a main control switch 84 and a relay control switch 85 in addition to the intervalometer 86. Output plugs and cables 88 and 90, respectively, are connected to the torque-limiting device and to the ejector mechanism.

In operation, the material dispensing apparatus is first loaded with packages of material to be dispensed. To do this, as stated above, the momentary control switch 43 is held closed while driving chain 16 and the push members 18 are moved so that one push member 18 is at the same level as stop flange 19 when the door is in a vertical position, whereupon the contact switch 43 is released, and the movement of the chain is again stopped. Then after the material is loaded on the door 14, it is pivoted with the door into the container where it will be supported entirely by the push members. This process is repeated until the container is full. As the material in the container moves along its length, it becomes increasingly supported by flanges 11 in container 12, see FIG. 6. The material in the container is gradually moved around the length of the container until, as seen in FIG. 2, it abuts some portion of the ejector plates 66. When this happens, ejector plates 66 which are continually rotating will force the foremost box 15 of material through the spring biased door 78 indicating that the dispenser is loaded and ready for operation.

The structure of the container and the cooperation between the flanges 11 and push members 18 means that each group of boxes of material loaded into the container will be firmly held in its proper position even through the vehicle is subject to rapidly changing velocities and orientations. The result is that this dispensing mechanism will function properly under these extreme conditions.

In case a jamming of the device occurs, such as failure of a package to be ejected through the door at the end of the channel when the dispenser has been completely filled, the torque-limiting device stops the travel of the chain 16 before the point where any of the chaff boxes would be crushed.

The foregoing description is to be interpreted as merely illustrative. Many modifications are possible without departing from the spirit of this invention. The scope of this invention is to be interpreted by reference to the appended claims wherein I claim:

1. In combination an airborne vehicle and means for dispensing articles from said vehicle, said means comprising a container formed in a continuous hollow loop conforming generally to the configuration of the inner peripheral surface of a lateral cross-section of said vehicle, said container comprising an outer wall secured to the inner surface of said vehicle, L-shaped side channels secured to said outer wall formed so that a portion of said L-shaped channels lies parallel to said outer wall and forms the inner wall of said container, said container having a substantially vertical portion of a length corresponding to the height of a predetermined number of stacked articles, said inner wall of said container terminating adjacent the ends of said vertical portion to form an opening, a loading door pivotally connected to said container at the base of said opening to lie within said loop and arranged to pivot from a horizontal to a vertical position to close said opening thereby transferring articles loaded on said loading door into said container, the length of said loading door corresponding to the length of said vertical portion, a pair of endless chains mounted to lie within said container, each of said chains extending along the length of said container and lying adjacent opposite sides thereof, mutually opposed pusher bars secured to said chains at positions along the length of said chains corresponding to the length of said vertical portion, a motor, sprocket means in driving engagement with said chains, clutch means connected with said motor and said sprocket means, torque limiting means connected with said clutch for disengaging said clutch when overload conditions occur, a rotatable ejector plate mounted in said container and operatively connected with said motor, projections on said ejector plate for engagement with articles in said container, said container having a generally horizontal portion at the bottom of said loop, a portion of said horizontally located outer wall of said container being removed to provide an opening for the ejection of an article engaged by a projection on said ejector plate, and a spring biased door mounted adjacent said opening, said door being opened against the bias of said spring by the force of the ejector plate upon the article.

2. A device for loading, indexing, storing, conveying to a downwardly directed dispensing site and dispensing in a downward direction rectangular boxes of material from an aircraft, said device comprising a tube-like container formed in a continuous hollow loop, a loading and indexing door hinged to said container to be lowered to a horizontal position for transferring a known number of boxes of material as a unit into said container in vertical, stacked position, a chain conveyor traveling the substantially circular extent of said container, means located at intervals on said chain for contacting, supporting and propelling a box along said container thereby propelling the entire contents of said container forwardly along said container, a horizontally disposed dispensing portion on said container, a downwardly directed opening located in said horizontal dispensing portion, a dispensing door hinged to the container at the periphery of said opening, said dispensing door being spring biased to closed position so that a degree of force is required to open said door for dispensing a box of material downwardly, a single motor, chain driving means connected to said motor for propelling said chain conveyor for moving said boxes along said container from the loading site to said dispensing opening, interval-controlled dispensing means driven by said motor and including rotatable ejector plates for propelling individual ones of said boxes downwardly through said door against the spring bias of said door so that each box is given a downward impetus to free it from the aircraft slip stream and so that each box proceeds thereafter by gravity, clutch means between said chain driving means and said motor, said clutch means being actuated by jamming pressure of said boxes in said container for disconnecting said chain driving means from said motor when back pressure due to jamming occurs in said container.

References Cited in the file of this patent

UNITED STATES PATENTS

| | | |
|---|---|---|
| 471,052 | Henry | Mar. 15, 1892 |
| 1,821,111 | Mudd | Sept. 1, 1931 |
| 1,879,884 | Rowe | Sept. 27, 1932 |
| 1,885,494 | Ulmann | Nov. 1, 1932 |
| 2,437,425 | Goodhue et al. | Mar. 9, 1948 |
| 2,474,975 | Goodhue | July 5, 1949 |
| 2,524,132 | Naugler et al. | Oct. 3, 1950 |
| 2,540,856 | Andrews et al. | Feb. 6, 1951 |
| 2,829,769 | Rockafellow | Apr. 8, 1958 |

FOREIGN PATENTS

| | | |
|---|---|---|
| 579,259 | Great Britain | July 29, 1946 |
| 934,506 | Germany | Oct. 27, 1955 |